United States Patent
Hagerty

(10) Patent No.: US 10,070,641 B2
(45) Date of Patent: Sep. 11, 2018

(54) DEVICE AND METHOD FOR POSITIONING A TRAP ON A POLE

(71) Applicant: Jeffry Stewart Hagerty, Onsted, MI (US)

(72) Inventor: Jeffry Stewart Hagerty, Onsted, MI (US)

(*) Notice: Subject to any disclaimer, the term of this patent is extended or adjusted under 35 U.S.C. 154(b) by 148 days.

(21) Appl. No.: 14/999,541

(22) Filed: May 20, 2016

(65) Prior Publication Data

US 2017/0332618 A1 Nov. 23, 2017

(51) Int. Cl.
*A01M 23/24* (2006.01)
*F16M 13/02* (2006.01)

(52) U.S. Cl.
CPC ........ *A01M 23/245* (2013.01); *F16M 13/022* (2013.01)

(58) Field of Classification Search
CPC .... A01M 23/28; A01M 23/24; A01M 23/245; A01M 23/26; A01M 23/265
See application file for complete search history.

(56) References Cited

U.S. PATENT DOCUMENTS

| | | | | |
|---|---|---|---|---|
| 1,201,427 A | * | 10/1916 | Angvick | A01M 23/245 126/30 |
| 1,476,529 A | * | 12/1923 | Lutz | A01M 23/24 43/91 |
| 4,152,861 A | | 5/1979 | Miller | |
| 4,226,042 A | * | 10/1980 | Gilbert | A01K 1/04 43/58 |
| 4,499,685 A | | 2/1985 | Sibley | |
| 9,173,390 B2 | | 11/2015 | Stephens | |
| 9,781,917 B1 | * | 10/2017 | Pribyl | A01M 23/34 |

FOREIGN PATENT DOCUMENTS

GB    146764 A  *  7/1920  ............ A01M 23/24

* cited by examiner

*Primary Examiner* — Jessica B Wong
(74) *Attorney, Agent, or Firm* — Timothy S. Stevens; Karen L. Kimble

(57) ABSTRACT

A device and method for positioning a coil spring actuated body grip trap on a pole. A strip of material having an aperture therethrough through is inserted between adjacent coils of the coil spring of a coil spring actuated body grip trap so that the aperture of the strip of material extends from the coils. A pole is driven into the ground, the pole having a diameter smaller than the diameter of the aperture of the strip of material. The aperture of the strip of material is slid onto the pole so that the body grip trap is at a desired position on the pole so that the aperture of the strip of material jam-locks on the pole by the weight of the trap.

1 Claim, 5 Drawing Sheets

DEVICE AND METHOD FOR POSITIONING A TRAP ON A POLE

BACKGROUND OF THE INVENTION

The instant invention relates to the trapping of fur bearing animals such as muskrat, mink, marten, raccoon, beaver and otter. The instant invention is an article of manufacture useful for positioning a body grip trap (also known as a Conibear type trap or a body hold trap) on a pole. A number of devices are known for positioning a body grip trap on a pole. For example, U.S. Pat. No. 4,152,861 disclosed a holder using a thumb nut and sleeve device. U.S. Pat. No. 4,499,685 disclosed a device using a rotating frame and band clamp. U.S. Pat. No. 9,173,399 disclosed a coil spring clip for positioning a body grip trap on a pole. U.S. patent application Ser. No. 14/756,349 filed Sep. 1, 2015 by the inventor of the instant application disclosed a clip engaged with a coil spring of a body grip trap for positioning the body grip trap on a pole by inserting a tab of the clip into a bracket positioned on the pole.

SUMMARY OF THE INVENTION

The instant invention is an important improvement upon the clip shown in FIGS. 9 and 10 of the above-mentioned U.S. patent application Ser. No. 14/756,349 because the article of manufacture of the instant application can be used to position a body grip trap directly on a pole without the need for an intervening bracket. More specifically, in one embodiment, the instant invention is a method for positioning a coil spring actuated body grip trap on a pole comprising: (a) inserting a strip of material through adjacent coils of the coil spring of a coil spring actuated body grip trap, the strip of material having an aperture therethrough so that the aperture of the strip of material extends from said coils; (b) driving a pole into the ground, the pole having a diameter smaller than the diameter of the aperture of the strip of material; and (c) sliding the aperture of the strip of material onto the pole so that the body grip trap is at a desired position on the pole so that the aperture of the strip of material jam-locks on the pole by the weight of the trap.

In another embodiment, the instant invention is an article of manufacture for positioning a coil spring actuated body grip trap on a pole, comprising a configured strip of material comprising a geometrically configured first portion, a second portion extending tangentially from one side of the geometrically configured first portion, the second portion having an aperture therethrough and a third portion extending tangentially from the other side of the geometrically configured first portion, wherein the geometry of the geometrically configured first portion is an open mouthed polygonal structure wherein the number of sides of the polygonal structure range from three to infinity to form an open mouth structure ranging from a three sided structure to a semicircular structure respectively so that the coil spring of a coil spring actuated body grip trap can be inserted into the geometrically configured first portion of said article of manufacture with the second portion of said article of manufacture extending from said coil spring so that the aperture of the second portion of article of manufacture can be slid onto a pole having a diameter smaller than the diameter of the aperture so that the body grip trap is at a desired position on the pole so that said article of manufacture jam-locks on the pole by the weight of the trap.

In yet another embodiment, the instant invention is an article of manufacture comprising a configured strip of material comprising a semicircular first portion, a second portion extending tangentially from one side of the semicircular central first portion, the second portion having an aperture therethrough and a third semicircular portion extending tangentially from the other side of the semicircular central first portion in a direction away from the second portion so that adjacent coils of a coil spring actuated body grip trap can be inserted into the semicircular first and third portions respectively with the second portion of said article of manufacture extending from said coils so that the aperture of the second portion of article of manufacture can be slid onto a pole having a diameter smaller than the diameter of the aperture so that the body grip trap is at a desired position on the pole so that said article of manufacture jam-locks on the pole by the weight of the trap

DETAILED DESCRIPTION OF THE INVENTION

Figure 1:
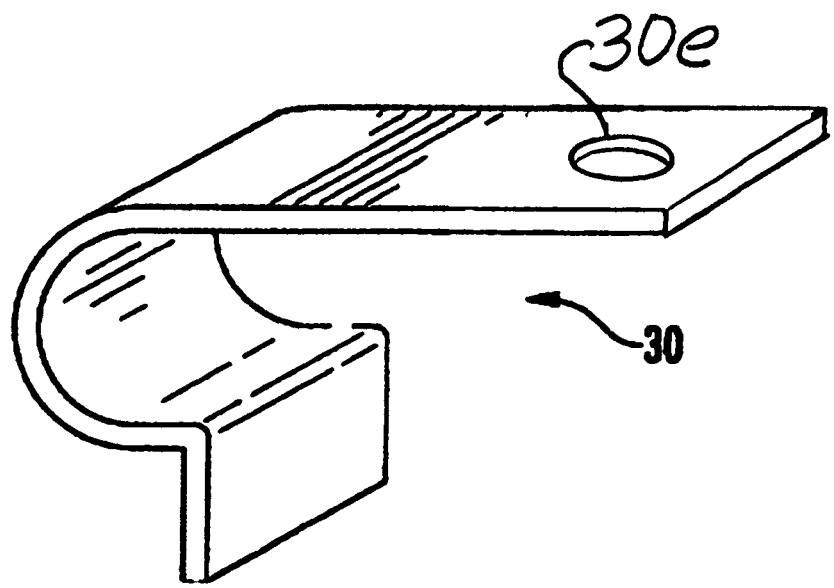
FIG. 1 is a perspective view of a highly preferred embodiment of the instant invention in the form of a strip of steel configured as shown and having an aperture therethrough.
Figure 2:
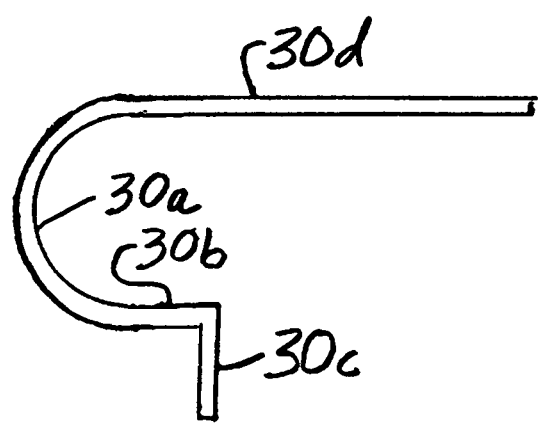
FIG. 2 is a side view of the embodiment shown in FIG. 1.
Figure 6:
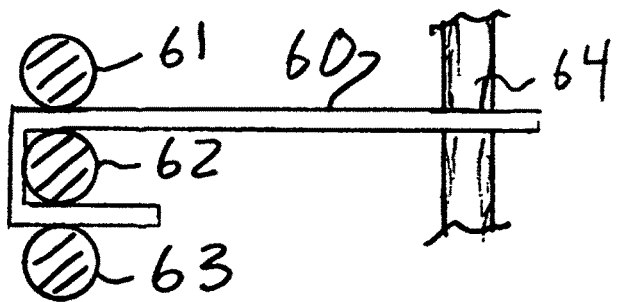
FIG. 6 depicts a side view of a configured strip of material inserted between the coils of a coil spring body grip trap positioned on a pole.
Figure 7:
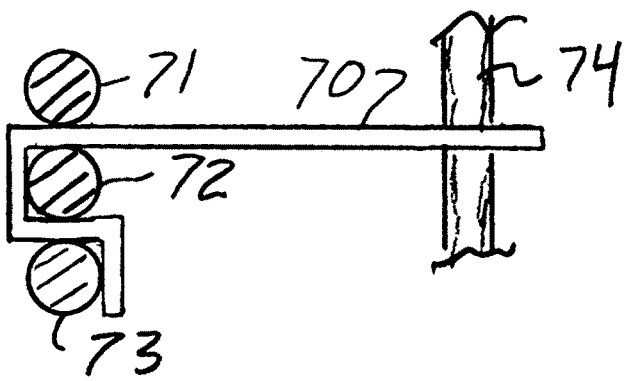
FIG. 7 depicts a side view of a differently configured strip of material inserted between the coils of a coil spring body grip trap positioned on a pole.

Referring now to FIG. 1, therein is shown a perspective view of a preferred clip 30 of the instant invention in the form of a strip of steel configured as shown and having an aperture 30e therethrough. Referring now to FIG. 2, therein is shown a side view of the clip shown in FIG. 1, the clip having a semicircular central first portion 30a, a second portion 30d extending tangentially from one side of the semicircular central first portion, the second portion 30d having an aperture therethrough as shown in FIG. 1, a third portion 30b extending tangentially from the other side of the semicircular central first portion 30a and a fourth portion 30c extending from the third portion 30b in a direction away from the second portion 30d and third portion 30c. The angle between the third portion 30b and the fourth portion 30c is most preferably about 90 degrees. The semicircular central first portion 30a is a polygonal structure having an infinite number of sides. It should be understood that the central portion of an article of the instant invention can be a polygonal structure have three sides as shown in FIGS. 6 & 7.

Figure 3:
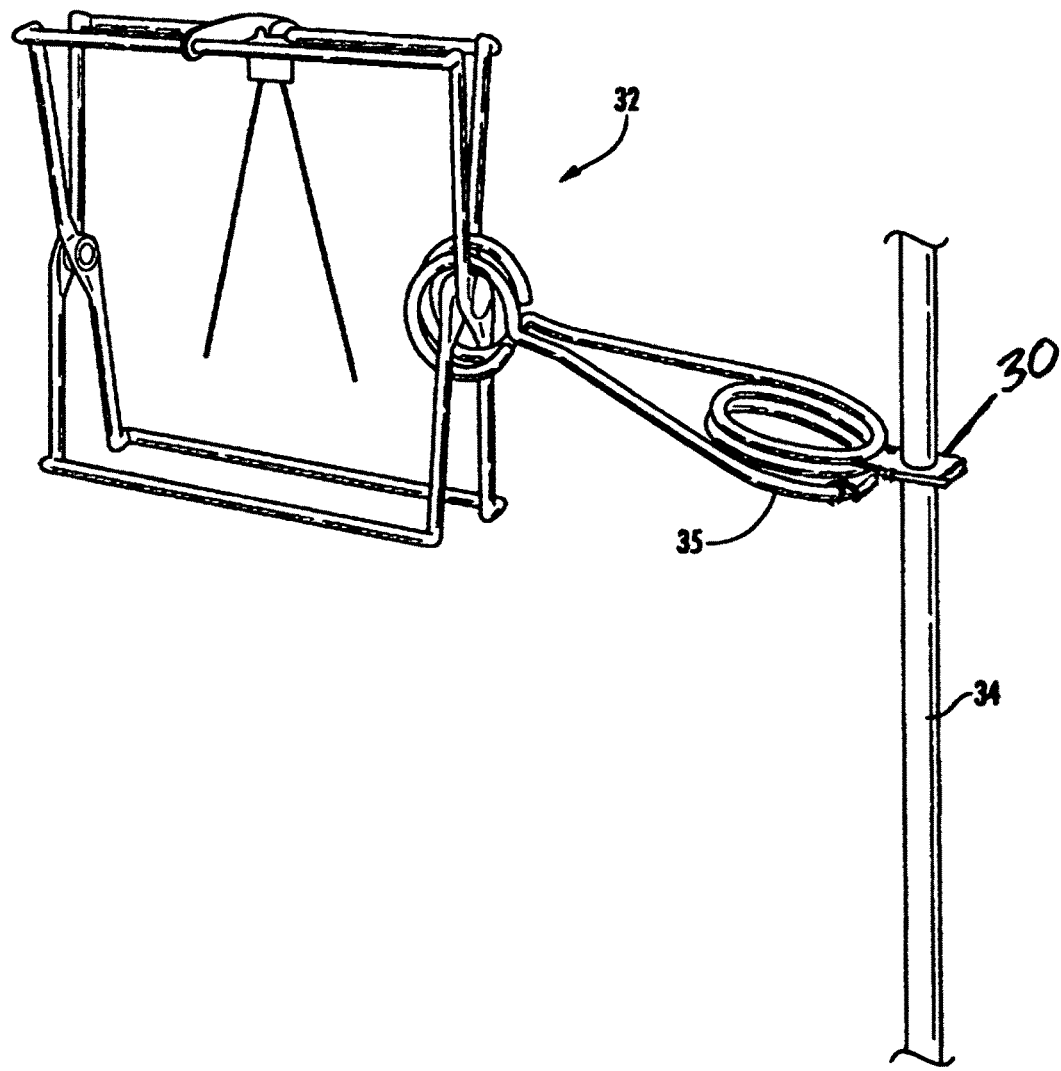
FIG. 3 is a perspective view of the embodiment shown in FIG. 1 engaged with the coil spring of a body grip trap positioned on a pole inserted through the aperture of the embodiment shown in FIG. 1.

Referring now to FIG. 3, therein is shown a body grip trap 32, actuated by coil spring 35, trap 32 being positioned at a desired position on pole 34 by way of clip 30 engaged with coil spring 35 as shown, the diameter of the aperture 30e (shown in FIG. 1) in clip 30 being larger than the diameter of pole 34 so that downward weight of trap 32 jam-locks clip 30 on pole 34. Fourth portion 30c of clip 30 (shown in FIG. 2) further hinders rotation of clip 30 on coil spring 35 of trap 32.

Figure 4:
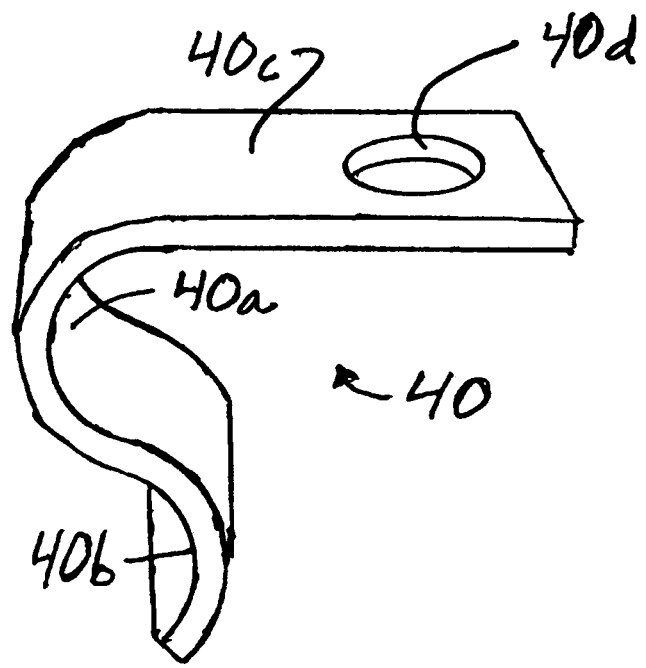
FIG. 4 is a perspective view of another a highly preferred embodiment of the instant invention in the form of a strip of steel configured as shown and having an aperture therethrough.
Figure 8:
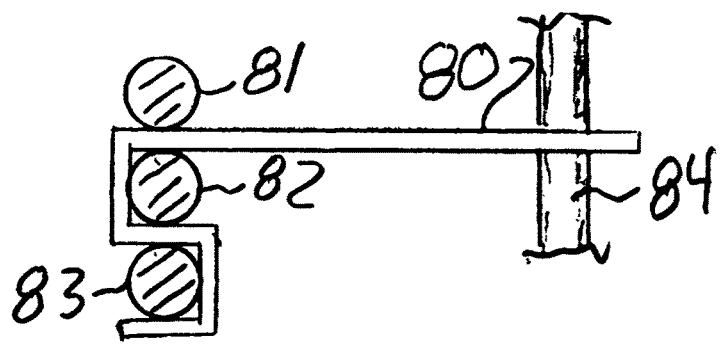
FIG. 8 depicts a side view of an even differently configured strip of material inserted between the coils of a coil spring body grip trap positioned on a pole.
Figure 11:
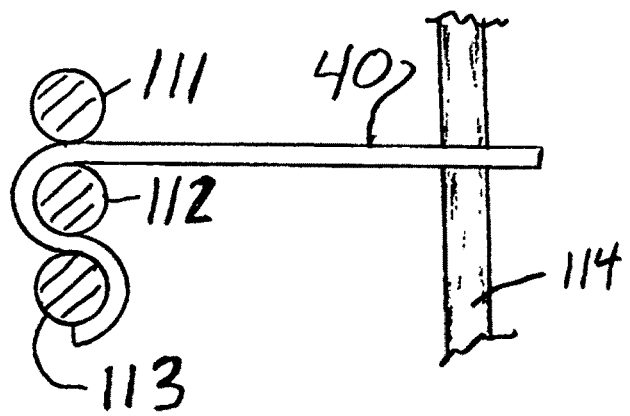
FIG. 11 depicts a side view of the highly preferred embodiment of the instant invention of FIG. 4 inserted into adjacent coils of a coil spring actuated body grip trap positioned on a pole.

Referring now to FIG. 4, therein is shown a perspective view of an even more highly preferred clip 40 of the instant invention in the form of a strip of steel configured as shown and having an aperture 40d therethrough. Clip 40 has a semicircular central first portion 40a, a second portion 40c extending tangentially from one side of the semicircular central first portion 40a and a semicircular third portion 40b extending tangentially from the other side of the semicircular central first portion 40a in a direction away from the second portion 40c. The clip 40 has the same utility as the clip 30 shown in FIGS. 1-3. FIG. 11 is a side view of the highly preferred embodiment of the instant invention 40 shown in FIG. 4 inserted into adjacent coils 111, 112 and 113 of a coil spring actuated body grip trap positioned on pole 114. The semicircular portions 40a and 40b are a polygonal structures having an infinite number of sides. It should be understood that these portions of an article of the instant invention can be a polygonal structure have three sides as shown in FIG. 8.

Figure 5:
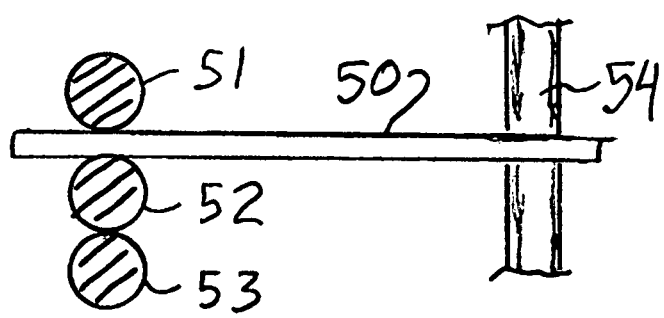
FIG. 5 depicts a side view of a strip of material inserted between the coils of a coil spring body grip trap positioned on a pole.

A highly preferred article of the instant invention is made from a 0.1 inch thick, 0.75 inch wide strip of steel. An article made from a 10 gauge strip of steel is contemplated for use with a relatively large body grip trap. It will be understood that the article of the instant invention can be made from other materials such as another metal. The article of the instant invention can even be made from a plastic or polymer material. The inside diameter of the semicircular portions(s) of the instant invention is preferably dimensioned to be about the same or a bit greater than the diameter of the coils of the coil spring actuated body grip trap. Thus, an article having a smaller inside diameter semicircular portion(s) would be used with a smaller body grip trap having a smaller diameter coil spring. Conversely, a clip having a larger inside diameter semicircular portion(s) would be used with a larger body grip trap having a larger diameter coil spring. And, an article having a smaller three sided open mouth portion(s) would be used with a smaller body grip trap having a smaller diameter coil spring. Conversely, a clip having a larger three sided open mouth portion(s) would be used with a larger body grip trap having a larger diameter coil spring. Conversely, a clip having a larger three sided open mouth portion(s) would be used with a larger body grip trap having a larger diameter coil spring Referring now to FIG. 5, therein is shown a side view of a strip of material 50 inserted between the cross-sectioned coils 51, 52 and 53 of a coil spring actuated body grip trap positioned on a pole 54 by inserting the strip of material 50 through adjacent coils 51 and 52 of the trap, the strip of material 50 having an aperture therethrough so that the aperture of the strip of material 50 extends from said coils, pole 54 having been driven into the ground, pole 54 having a diameter smaller than the diameter of the aperture of the strip of material 50 so that the body grip trap is at a desired position on pole 54 so that the aperture of the strip of material 50 jam-locks on pole 54 by the weight of the trap.

Referring now to FIG. 6, therein is shown a side view of a strip of material 60 inserted between the cross-sectioned coils 61, 62 and 63 of a coil spring actuated body grip trap positioned on a pole 64 by inserting the strip of material 60 through adjacent coils 61, 62 and 63 of the trap, the strip of material 60 having an aperture therethrough so that the aperture of the strip of material 60 extends from said coils, pole 64 having been driven into the ground, pole 64 having a diameter smaller than the diameter of the aperture of the strip of material 60 so that the body grip trap is at a desired position on pole 64 so that the aperture of the strip of material 60 jam-locks on pole 64 by the weight of the trap. The end of the strip of material 60 inserted through adjacent coils 61, 62 and 63 has a three sided polygonal open mouth structure to surround coil 62.

Referring now to FIG. 7, therein is shown a side view of a strip of material 70 inserted between the cross-sectioned coils 71, 72 and 73 of a coil spring actuated body grip trap positioned on a pole 74 by inserting the strip of material 70 through adjacent coils 71, 72 and 73 of the trap, the strip of material 70 having an aperture therethrough so that the aperture of the strip of material 70 extends from said coils, pole 74 having been driven into the ground, pole 74 having a diameter smaller than the diameter of the aperture of the strip of material 70 so that the body grip trap is at a desired position on pole 74 so that the aperture of the strip of material 70 jam-locks on pole 74 by the weight of the trap. The end of the strip of material 70 inserted through adjacent coils 71, 72 and 73 has a three sided polygonal open mouth structure to surround coil 72 and a portion resting on coil 73.

Referring now to FIG. 8, therein is shown a side view of a strip of material 80 inserted between the cross-sectioned coils 81, 82 and 83 of a coil spring actuated body grip trap positioned on a pole 84 by inserting the strip of material 80 through adjacent coils 81, 82 and 83 of the trap, the strip of material 80 having an aperture therethrough so that the aperture of the strip of material 80 extends from said coils, pole 84 having been driven into the ground, pole 84 having a diameter smaller than the diameter of the aperture of the strip of material 80 so that the body grip trap is at a desired position on pole 84 so that the aperture of the strip of material 80 jam-locks on pole 84 by the weight of the trap. The end portions of the strip of material 80 inserted through adjacent coils 81, 82 and 83 comprise three sided polygonal open mouth structures to surround coils 82 and 83.

Figure 9:
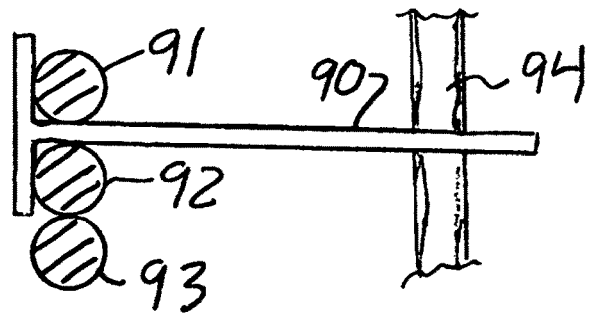
FIG. 9 depicts a side view of a yet differently configured strip of material inserted between the coils of a coil spring body grip trap positioned on a pole.

Referring now to FIG. 9, therein is shown a side view of a strip of material 90 inserted between the cross-sectioned coils 91 and 92 of a coil spring actuated body grip trap positioned on a pole 94 by inserting the strip of material 90 through adjacent coils 91 and 92 of the trap, the strip of material 90 having an aperture therethrough so that the aperture of the strip of material 90 extends from said coils, pole 94 having been driven into the ground, pole 94 having a diameter smaller than the diameter of the aperture of the strip of material 90 so that the body grip trap is at a desired position on pole 94 so that the aperture of the strip of material 90 jam-locks on pole 94 by the weight of the trap. One end of strip of material 90 is T-shaped with the arms of the T bearing against coil 91 and coil 92 respectively.

Figure 10:
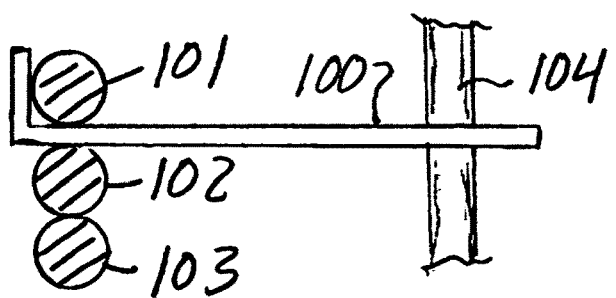
FIG. 10 depicts a side view of a still yet differently configured strip of material inserted between the coils of a coil spring body grip trap positioned on a pole.

Referring now to FIG. 10, therein is shown a side view of a strip of material 100 inserted between the cross-sectioned coils 101 and 102 of a coil spring actuated body grip trap positioned on a pole 104 by inserting the strip of material 100 through adjacent coils 101 and 102 of the trap, the strip of material 100 having an aperture therethrough so that the aperture of the strip of material 100 extends from said coils, pole 104 having been driven into the ground, pole 104 having a diameter smaller than the diameter of the aperture of the strip of material 100 so that the body grip trap is at a desired position on pole 104 so that the aperture of the strip of material 100 jam-locks on pole 104 by the weight of the trap. One end of strip of material 100 is L-shaped with the 90 degree bent arm of the L bearing against coil 101.

Referring now to FIG. 11, therein is shown article 40 detailed in the discussion above engaged with coils 111, 112 and 113 of a coil spring actuated body grip trap positioned on pole 114, pole 114 having been driven into the ground, pole 114 having a diameter smaller than the diameter of the aperture of article 40 so that the body grip trap is at a desired position on pole 114 so that the aperture of article 40 jam-locks on pole 114 by the weight of the trap.

CONCLUSION

While the instant invention has been described above according to its highly preferred embodiments, it can be modified within the spirit and scope of this disclosure. This application is therefore intended to cover any variations, uses, or adaptations of the instant invention using the general principles disclosed herein. Further, the instant application is intended to cover such departures from the present disclosure as come within the known or customary practice in the art to which this invention pertains.

What is claimed is:

1. An article of manufacture comprising a configured strip of material, comprising:
    (a) a semicircular central first portion;
    (b) a second portion extending tangentially from one end of the semicircular central first portion, the second portion having an aperture therethrough and;
    (c) a third semicircular portion extending tangentially from the other end of the semicircular central first portion in a direction away from the second portion;
    (d) a coil spring actuated body hold trap comprising adjacent coils of said coil spring; and
    (e) a pole, wherein the adjacent coils of said coil spring of said coil spring actuated body grip trap can be inserted into the semicircular first and third portions respectively with the second portion of said article of manufacture extending from said coils so that the aperture of the second portion of article of manufacture can be slid onto said pole, said pole having a diameter smaller than the diameter of said aperture so that the body grip trap is at a desired position on the pole so that said article of manufacture jam-locks on the pole by the weight of the trap.

* * * * *